V. BIELA.
GEAR WHEEL.
APPLICATION FILED MAR. 10, 1914.
1,142,661.
Patented June 8, 1915.
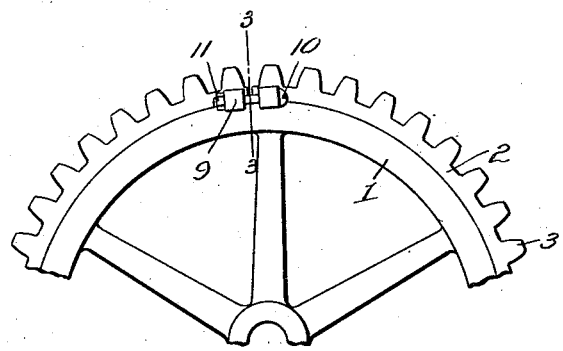
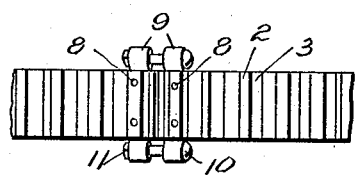
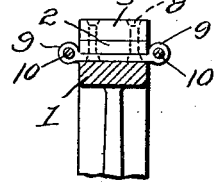
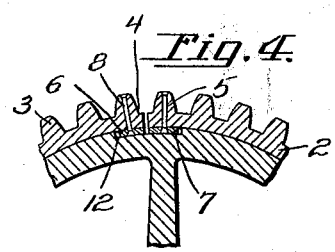
Inventor
Valentine Biela.
Witnesses
F. C. Gibson.
C. C. Hiner.
By Victor J. Evans
Attorney

UNITED STATES PATENT OFFICE.

VALENTINE BIELA, OF CESTOHOWA, TEXAS.

GEAR-WHEEL.

1,142,661.  Specification of Letters Patent.  Patented June 8, 1915.

Application filed March 10, 1914. Serial No. 823,778.

*To all whom it may concern:*

Be it known that I, VALENTINE BIELA, a citizen of the United States, residing at Cestohowa, in the county of Karnes and State of Texas, have invented new and useful Improvements in Gear-Wheels, of which the following is a specification.

This invention relates to gear wheels, and its primary object is to provide a construction of wheel and gear rim, whereby an ordinary buggy, wagon or other vehicle wheel may be easily, conveniently and economically converted into a gear wheel.

A further object of the invention is to provide a construction of gear rim composed of one or more parts, in conjunction with coupling means for uniting the ends or sections of the rim, and simultaneously locking the rim against circumferential displacement upon the wheel rim.

The invention consists of the features of construction, combination and arrangement of parts herein fully described and claimed, reference being had to the accompanying drawing in which:—

Figure 1 is a side elevation of a portion of a gear wheel constructed in accordance with my invention. Fig. 2 is a plan view of the same. Fig. 3 is a transverse section on the line 3—3 of Fig. 1. Fig. 4 is a section taken circumferentially of the wheel through the joint.

Referring to the drawing 1 designates the rim or felly of a wheel of any ordinary construction, such as a vehicle wheel of the character set forth, from which the usual tire has been removed. Surrounding the said felly 1 is a gear rim 2 provided with the usual gear teeth 3. This gear rim 2 may consist of a split ring made in a single piece, or it may be made of a series of gear segments. I have not deemed it necessary in the present instance to illustrate a gear rim of sectional construction, as the same principle of uniting the ends of a rim made of a single piece or the adjoining ends of a series of segmental rim sections will be employed and is herein fully disclosed.

As shown the ends 4 and 5 of the gear rim are provided upon their inner surfaces with transversely extending plates or coupling members 6 and 7, which are secured thereto by rivets 8 passing through the body of the rim and the adjacent gear teeth. These plates extend beyond the sides of the felly 1 and rim 2 and are provided with terminal loops or eyes 9, the loops or eyes 9 at each side of the wheel being connected by a fastening belt 10 provided with an adjusting and retaining nut 11.

It will be understood from the foregoing that when rim 2 is applied to the felly 1 and the nuts 11 are tightened up the rim 2 may be drawn as securely as desired about the felly, by which it will be contracted to the desired degree to hold it from displacement. The wheel 1 thus equipped with a gear rim 2 of the construction described is adapted to efficiently perform the functions of a gear wheel, enabling any ordinary form of vehicle wheel to be converted into a gear wheel in an easy, convenient and economical manner. Preferably the plates 6 and 7 are countersunk in sockets or mortises 12 in the face of the felly 1, by which the gear rim is held from slipping around the felly under the pull of the traction chain.

It will be observed that by fastening the plates to the rim by means of rivets which pass through the adjacent gear teeth, a strong and durable coupling connection is secured without weakening the gear rim in any particular.

I claim:—

1. The combination, in a gear wheel, of a wheel proper having a felly provided with a transverse recess or mortise in the periphery thereof, a split gear rim surrounding said felly and having end portions disposed in line with said mortise, coupling plates fixed to the ends of the gear rim and seated in said mortise and projecting beyond the sides of the rim, said plates being provided with terminal eyes, and coupling bolts passing through the eyes of the coupling plates at opposite sides of the wheel and uniting the ends of the gear rim, the coupling plates serving also by the engagement with the walls in the mortise to hold the rim from creeping upon the felly.

2. The combination, in a gear wheel, of a wheel proper having a felly provided with a recess or mortise in the periphery thereof, a split gear rim surrounding said felly and having end portions disposed in line with said mortise, coupling plates extending transversely on the inner side of the ends of the rim and projecting beyond the sides of the rim and provided with terminal eyes, rivets passing through said plates and the body portion and adjacent teeth of the wheel rim and fastening said plates to the wheel rim, and coupling bolts passing through the eyes of the coupling plates at opposite sides of the wheel and uniting the ends of the gear rim.

In testimony whereof I affix my signature in presence of two witnesses.

VALENTINE BIELA.

Witnesses:
  JOHN KYRISH,
  BRON KYRISH.

Copies of this patent may be obtained for five cents each, by addressing the "Commissioner of Patents, Washington, D. C."